June 16, 1925. 1,542,526
A. S. ROBINSON
AUTOMOBILE BED
Filed July 23, 1924

Inventor
AMOS S. ROBINSON
his Attorneys

Patented June 16, 1925.

1,542,526

UNITED STATES PATENT OFFICE.

AMOS S. ROBINSON, OF COLUMBUS, OHIO.

AUTOMOBILE BED.

Application filed July 23, 1924. Serial No. 727,826.

*To all whom it may concern:*

Be it known that I, AMOS S. ROBINSON, a citizen of the United States, residing at Columbus, in the county of Franklin and State of Ohio, have invented a certain new and useful Improvement in Automobile Beds, of which the following is a specification.

Because of the expense of lodgings in hotels touring the country in an automobile is justifiably indulged in only by the very rich or the near very rich. To sleep comfortably on the seats of the ordinary automobile for several nights in succession is impossible because they are not long enough to permit that stretching of the legs which is necessary to secure restful relaxation. To carry and use a tent and cots involves much labor, loss of time from the real joy of touring and an unsightly loading of the car—not to dilate upon the discomforts and anxieties engendered by rain storms and the attacks of vicious insects. Several plans have been proposed to embody sleeping accommodations with an automobile but as far as I am aware such arrangements have not met with very general public acceptance because of their expense or because the departure from standards of construction have militated against the stability of the car or its chaste appearance.

The object of the present invention is to provide a construction whereby a comfortable full length bed can be arranged without such an alteration of the car or its frame as will materially lessen its strength or mar its appearance either interiorly or exteriorly.

It is one of the features of my invention to provide means whereby the cushion of the stationary rear seat and a movable cushioned back therefor may be placed together and supplemented longitudinally of the seat beyond the side wall of the car to form a full length bed extending crosswise of the car. Other features will be hereafter disclosed the points of novelty being finally claimed.

In the accompanying drawings which illustrate one embodiment of the invention.

Figures 3, 4, 5:
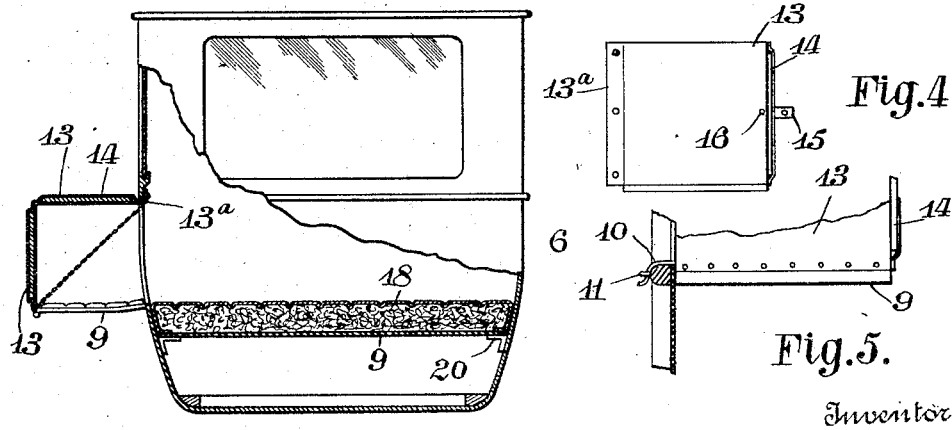
Fig. 3 is a view of the rear end of the car body partly in vertical cross section on the line III Fig. 2 showing the foot of the bed extended.
Fig. 4 illustrates a side view of the hood for the extended foot of the bed.
Fig. 5 is a detail on a larger scale showing the manner of hinging the foot extension of the bed.

In the views 6 designates the car body which may be of any type but is preferably of the limousine variety. It is also preferable that the body be provided with the two usual forward doors 7 only. The left hand side of the body at its rear portion is made with a rectangular opening the outline of which is indicated at 8, said opening to be normally closed by a cover or panel 9 hinged at its lower edge to the body by a pair of curved tongues, like that shown at 10, extending through keepers 11 so that the cover can be turned up to occupy a position flush with the outer surface of the body. The hinging members 10 are formed to permit the cover 9 to be turned down outward from the side of the car to horizontal position in which position it is supported by chains 12 suitably secured to hooks at the inner side of the car body. To provide a collapsible hood for the foot extension there is secured to a wooden marginal frame on the inner side of the cover 9 a flexible member comprising pieces of canvas or ducking 13 stitched together to form four rectangular pockets into each of which is inserted a panel or board of thin wood 14, said boards being of nearly the exact dimension of the pockets so that when all four of the boards or panels are inserted in their respective pockets the canvas hood is held upright and forms four sides of an inclosure with an opening into it through the wall of the body of the car, the panel 9 forming the closed bottom of the extended inclosure. The openings to the pockets in the canvas hood for the insertion of the top and the end pieces of the sustaining boards are left at the inner edges of the canvas adjacent the body of the car, while the opening for the outer or vertical pocket is left at one of the vertical ends as shown at the right hand side of Fig. 4; and the outer ply of canvas of that pocket can be provided with a tab 15 having a snap button fastening member thereon to engage a complementary fastening member 16 on the adjacent end pocket to confine the board in its pocket. It is this board of the outer pocket that holds the rest of the hood parts in proper position together with margins such as shown at 13ª on the inner edges of the two end and top pockets which are buttoned to suitable members on the inner side of the margins of the opening 8.

When all the boards are removed from their pockets the canvas hood can be collapsed or folded down onto the upper face of the panel or cover 9 and the latter raised into position to close the opening 8. When so raised and latched the canvas member and the supporting chains 12 can be concealed with a curtain made of the same material as the covering for the upholstery and fastened by suitable buttons.

Figure 1:
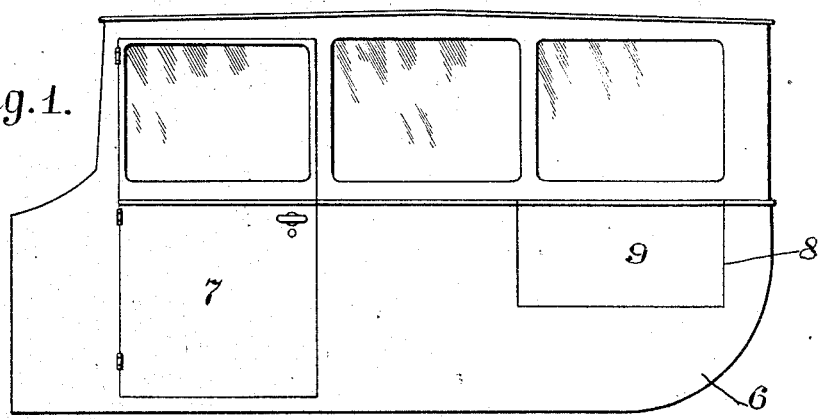
Figure 1 is a view in elevation of the left hand side of a car body as it appears modified for my invention.
Figure 2:
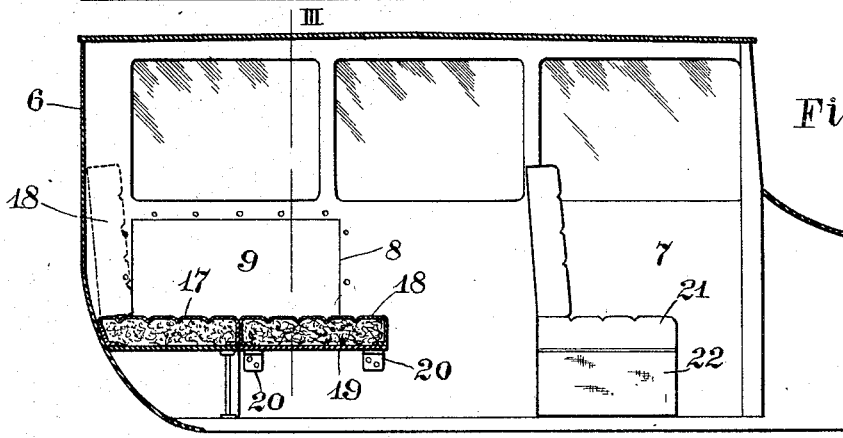
Fig. 2 is a vertical longitudinal section of the car body looking toward the left hand side thereof.

The cover or panel 9 is upholstered sufficiently at its inner side to provide a soft surface alining substantially horizontally with the surface of the cushion of the permanent rear seat 17 so that a person lying on that seat can extend his nether extremities through the opening 8 and find a comfortable resting place there. To double the capacity of the bed thus formed the back cushion of the seat, shown at 18 in broken lines in Fig. 2, is made removable with a stiff back at 19 and placed upon small brackets 20 at opposite sides of the car body beside the fixed seat and on a level therewith. The placing of the back cushion in just described manner affords room for a second person whose feet can also be projected through the opening 8 to rest upon the upholstered panel 9.

The seat 21 for the driver is, according to my present proposal, made movable about the car but will be provided with any suitable and well understood means for quickly fixing it to the floor of the body in proper position for managing the steering wheel. When disengaged from the floor the driving seat can be turned around and moved forward to the right hand corner of the car thereby providing a large clear space within the car for dressing or undressing. Indeed in such a space it will be practicable to set up a small folding table for dining, playing cards, checkers or other indoor games. It will be appreciated that this space is much increased by postponing the placing of the back cushion in its double bed forming position. Much of the space below the seat 21 can be utilized for storing various articles and for this purpose such space can be inclosed with a suitable curtain of fabric 22 or other material attached to the rim of the seat.

The forms of the parts can be changed without departing from the gist of the invention as claimed.

What I claim is:

1. A vehicle body having a transverse fixed rear seat and an opening in the side wall of the body portion only opposite an end of said seat, a closure for said opening adapted to be extended beyond the side of the vehicle body to provide room for a bed portion cooperating with and as an addition to said seat to form a bed extending transversely of the vehicle.

2. A vehicle body having a transverse fixed rear seat and an opening in the side wall of the body portion only opposite an end of said seat, a closure for said opening hinged to the wall of the body adapted to be extended beyond the side of the vehicle body to provide room for a bed portion cooperating with and as a longitudinal addition to said seat transversely to the vehicle to form a bed.

3. A vehicle body having a transverse rear seat and an opening in the side wall of the body portion only opposite an end of said seat, a closure for said opening adapted to be extended beyond the side of the vehicle body to provide room for a bed portion cooperating with and as a longitudinal addition to said seat to form a bed and a collapsible hood of flexible material cooperating with said closure to exclude weather from said extended room.

4. A vehicle body having an opening in its side wall opposite an end of the rear seat in said body, a closure for said opening adapted to be extended beyond the side of the vehicle body to provide room for a bed portion cooperating with and as an addition to said seat to form a bed and a collapsible hood cooperating with said closure to exclude weather from said extended room consisting of a flexible member having four united rectagular pockets to receive stiffening elements.

5. A vehicle body having a rear seat and a removable back cushion therefor, said body provided with an opening in the side wall of the body portion only opposite an end of said seat, a closure for said opening adapted to be extended beyond the side of the vehicle body to provide room for a bed portion cooperating with and as a longitudinal addition to said seat to form a bed and means for supporting said removable back cushion adjacent said rear seat also to cooperate with said closure in forming a bed extending lengthwise transversely of the vehicle.

6. A vehicle body having a transverse seat and an opening in the side portion of the body of the car only opposite the end of said seat and a closure for said opening providing room beyond the side of the body of the car for a bed portion adapted to cooperate with said seat to form a bed extending transversely of the vehicle.

AMOS S. ROBINSON.